(12) United States Patent  
Higashino (10) Patent No.: US 7,445,241 B2  
(45) Date of Patent: Nov. 4, 2008

(54) VEHICLE IMPACT ABSORPTION TYPE STEERING COLUMN DEVICE

(75) Inventor: Kiyoharu Higashino, Gunma-ken (JP)

(73) Assignee: NSK Ltd., Tokyo (JP)

( * ) Notice: Subject to any disclaimer, the term of this patent is extended or adjusted under 35 U.S.C. 154(b) by 247 days.

(21) Appl. No.: 10/516,679

(22) PCT Filed: Mar. 14, 2003

(86) PCT No.: PCT/JP03/03093

§ 371 (c)(1),  
(2), (4) Date: Dec. 6, 2004

(87) PCT Pub. No.: WO04/000626

PCT Pub. Date: Dec. 31, 2003

(65) Prior Publication Data

US 2006/0163861 A1 Jul. 27, 2006

(30) Foreign Application Priority Data

Jun. 19, 2002 (JP) ............................. 2002-179126

(51) Int. Cl.  
*B62D 1/18* (2006.01)  
*B62D 1/19* (2006.01)

(52) U.S. Cl. .................... 280/777; 74/492; 74/493; 280/775

(58) Field of Classification Search ........... 280/777, 280/779, 775; 74/493, 492  
See application file for complete search history.

(56) References Cited

U.S. PATENT DOCUMENTS

| 3,460,400 | A | * | 8/1969 | Kubokawa | ............... | 74/492 |
| 5,609,423 | A | * | 3/1997 | Jurik et al. | ............... | 384/518 |
| 6,371,519 | B1 | | 4/2002 | Jurik et al. | ............... | 280/777 |
| 2005/0029795 | A1 | * | 2/2005 | Camp et al. | ............... | 280/777 |

FOREIGN PATENT DOCUMENTS

| DE | 100 64 250 | | 9/2001 |
| EP | 0 856 452 | | 8/1998 |
| JP | 49-71632 | | 7/1974 |
| JP | 57-22965 | | 2/1982 |
| JP | 57051574 A | * | 3/1982 |
| JP | UM 61-189879 | | 11/1986 |
| JP | UM 62-61769 | | 4/1987 |
| JP | UM 63-26478 | | 2/1988 |
| JP | 10-100911 | | 4/1998 |

* cited by examiner

*Primary Examiner*—Ruth Ilan  
(74) *Attorney, Agent, or Firm*—Miles & Stockbridge P.C.

(57) ABSTRACT

An impact absorption type steering column apparatus for a vehicle is constructed such that a steering column is moved forwardly of the vehicle with respect to a car body sided member when a secondary collision happens. An outer peripheral surface of the steering column is fitted with a metallic ring that engages with the car body sided member to absorb impact energy while frictionally sliding on the steering column moving forwardly of the vehicle, when the secondary collision happens.

11 Claims, 11 Drawing Sheets

VEHICLE IMPACT ABSORPTION TYPE STEERING COLUMN DEVICE

TECHNICAL FIELD

The present invention relates to an impact absorption type steering column apparatus for a vehicle that is capable of extremely easily setting and adjusting a collapse load when a secondary collision happens.

BACKGROUND ARTS

In a steering column apparatus for a vehicle, a telescopic type capable of adjusting a steering column in axial directions corresponding to a driving posture is that an inner column is, for example, so fitted to an outer column fixed to a car body as to be capable of a telescopic motion.

Further, also in a non-telescopic type steering column apparatus incapable of making a telescopic adjustment, for instance, the inner column is so fitted to the outer column fixed to the car body as not to move at a normal time.

In such a telescopic or non-telescopic type steering column apparatus, when a secondary collision happens, for example, impact energy is absorbed by generating a collapse load while making the inner column frictionally slide on the outer column.

According to an impact absorption type in the telescopic or non-telescopic type steering column apparatus described above, however, the collapse load generated at a fitting portion between the two columns depends on a fitting state of the two columns and often becomes deficient. Conversely if the fitting state is excessively strengthened, the steering column gets hard to frictionally slide. Such being the case, it is difficult to set and adjust the collapse load.

Note that some of the telescopic type steering column apparatuses have a damper and a support member thereof which are fitted to an outer peripheral surface of the inner column, however, the damper and the support member operate only to prevent butting noises emitted upon butting between the damper and the outer column when regulating a telescopic motion, and none of those apparatuses absorb impact energy when the secondary collision happens.

DISCLOSURE OF THE INVENTION

It is an object of the present invention, which was devised under such circumstances, to provide an impact absorption type steering column apparatus for a vehicle that is capable of extremely easily setting and adjusting a collapse load when a secondary collision happens.

To accomplish the above object, in an impact absorption type telescopic steering column apparatus for a vehicle, in which a steering column is so provided as to be capable of a telescopic motion with respect to a car body sided member and is moved forwardly of the vehicle when a secondary collision happens, an impact absorption type steering column apparatus for a vehicle according to the present invention is characterized in that an outer peripheral surface of the steering column is fitted with a metallic ring functioning as a stopper which regulates a telescopic motion and frictionally slides on the steering column moving forwardly of the vehicle to absorb impact energy while engaging with the car body sided member, when a secondary collision happens.

Thus, according to a first aspect of the present invention, in the telescopic type steering column apparatus, the metallic ring is fitted to the outer peripheral surface of the steering column (e.g., the inner column). This metallic ring functions as the stopper which regulates the telescopic motion and engages with the car body sided member (e.g., an outer column, a car body sided bracket) and operates to absorb the impact energy while frictionally sliding on the steering column (e.g., an inner column) moving forwardly of the vehicle, when the secondary collision happens.

Accordingly, the setting and the adjustment of the collapse load can be highly facilitated by adjusting the fitting state (fastening state) of this metallic ring.

Further, in the impact absorption type steering column apparatus for the vehicle according to the first aspect of the present invention, preferably the metallic ring is provided with a damper for preventing butting noises emitted by abutting against the car body sided member when regulating the telescopic motion. In this case, when the damper provided on the metallic ring regulates the telescopic slide, it is possible to prevent the butting noises emitted by butting against the car body sided member (e.g., the outer column, the car body sided bracket) and also to restrain the impact thereof.

Moreover, according to a second aspect of the present invention, in an impact absorption type steering column apparatus for a vehicle, in which a steering column is so provided as not to move at a normal time with respect to a car body sided member and is moved forwardly of the vehicle with respect to the car body sided member when a secondary collision happens, an improvement is characterized in that an outer peripheral surface of the steering column is fitted with a metallic ring that engages with the car body sided member and absorbs impact energy while frictionally sliding on the steering column moving forwardly of the vehicle, when a secondary collision happens.

Thus, in the impact absorption type steering column apparatus according to a second aspect of the present invention, the metallic ring is fitted to the outer peripheral surface of the steering column (for example, the inner column). This metallic ring engages with the car body sided member (e.g., the outer column, the car body sided bracket) and operates to absorb the impact energy while frictionally sliding on the steering column (e.g., the inner column) moving forwardly of the vehicle, when the secondary collision happens. Accordingly, the setting and the adjustment of the collapse load can be highly facilitated by adjusting the fitting state (fastening state) of this metallic ring.

The second aspect of the present invention can be applied also to an impact absorption type non-telescopic steering column apparatus.

Note that the present invention can be applied also to an electric power steering type and is extremely effective in a column type electric power steering because of difficulty of setting a sufficient collapse quantity. Moreover, the present invention can be applied also to a tilt adjustable type steering column apparatus.

BRIEF DESCRIPTION OF THE DRAWINGS

FIGS. 10A through 10D are sectional views of the steering column in a sixth embodiment of the present invention; FIGS. 11A through 11D are sectional views of the steering column in the sixth embodiment of the present invention.

EMBODIMENTS OF THE INVENTION

An impact absorption type tilt/telescopic steering column apparatus according to an embodiment of the present invention will hereinafter be described with reference to the drawings.

First Embodiment

Figure 1:
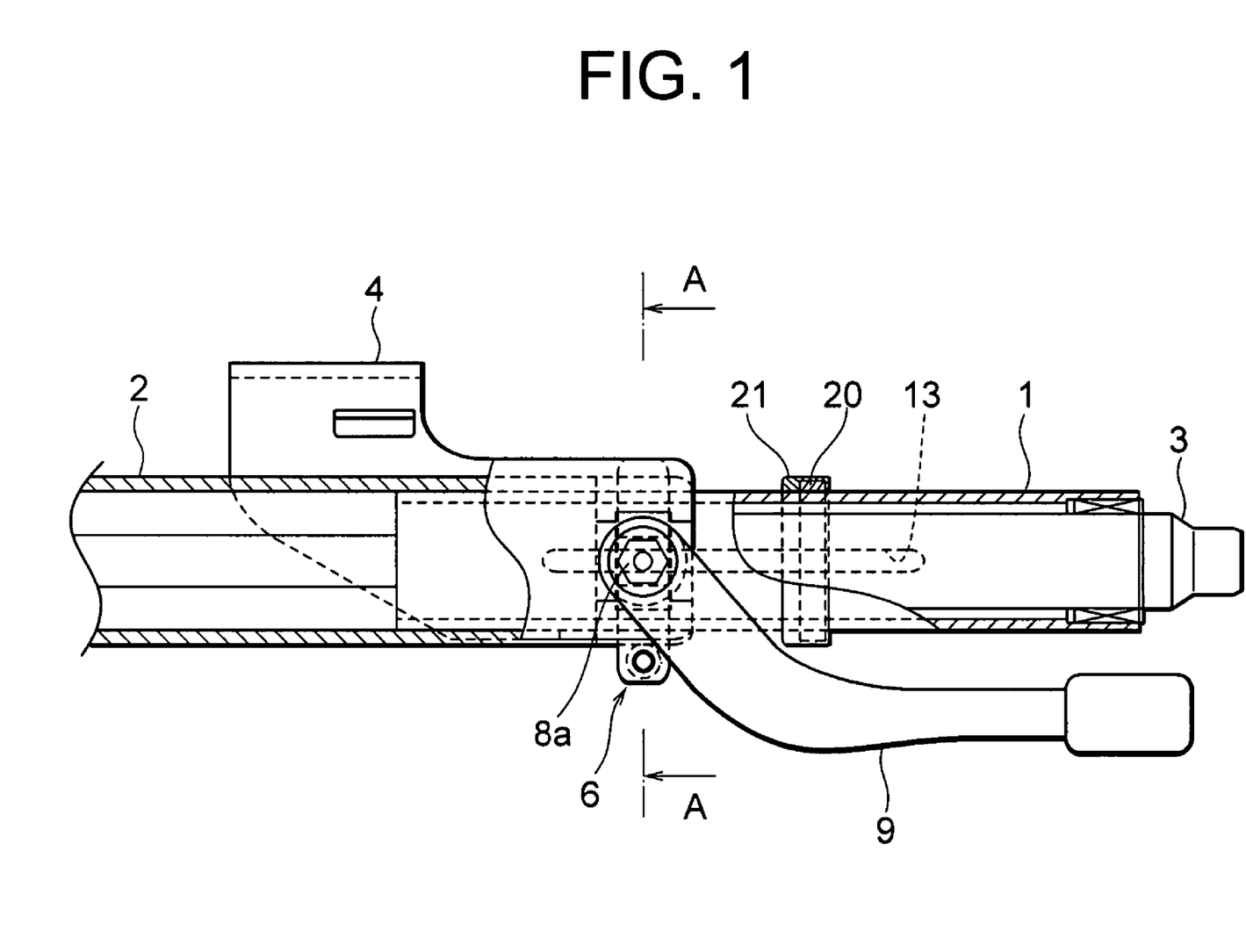
FIG. 1 is a side view of an impact absorption type tilt/telescopic steering column apparatus according to a first embodiment of the present invention.
Figure 2:
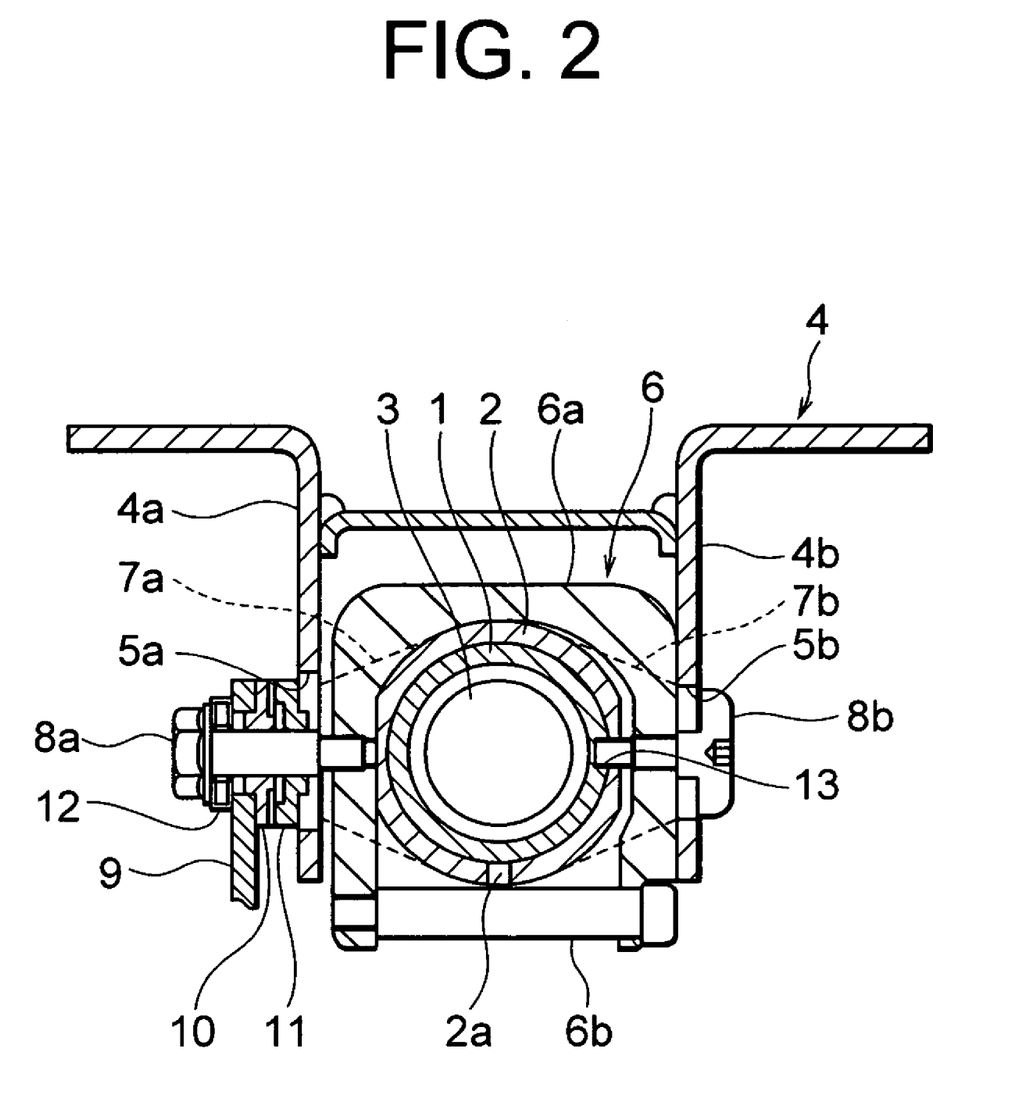
FIG. 2 is a sectional view taken along the line A-A in FIG. 1.
Figure 3:
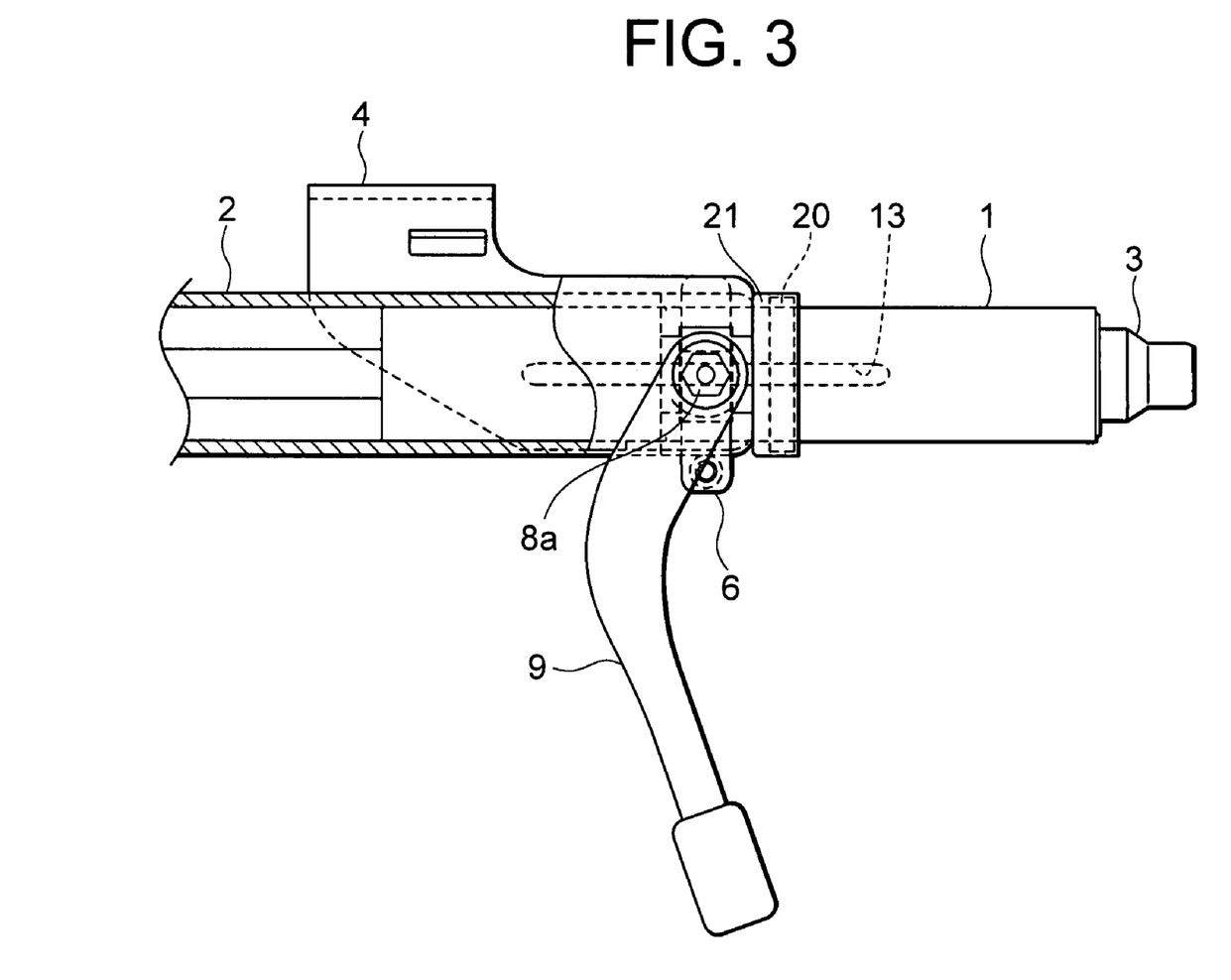
FIG. 3 is a side view of the steering column apparatus illustrated in FIG. 1, showing a shortest telescopic state.
Figure 4:
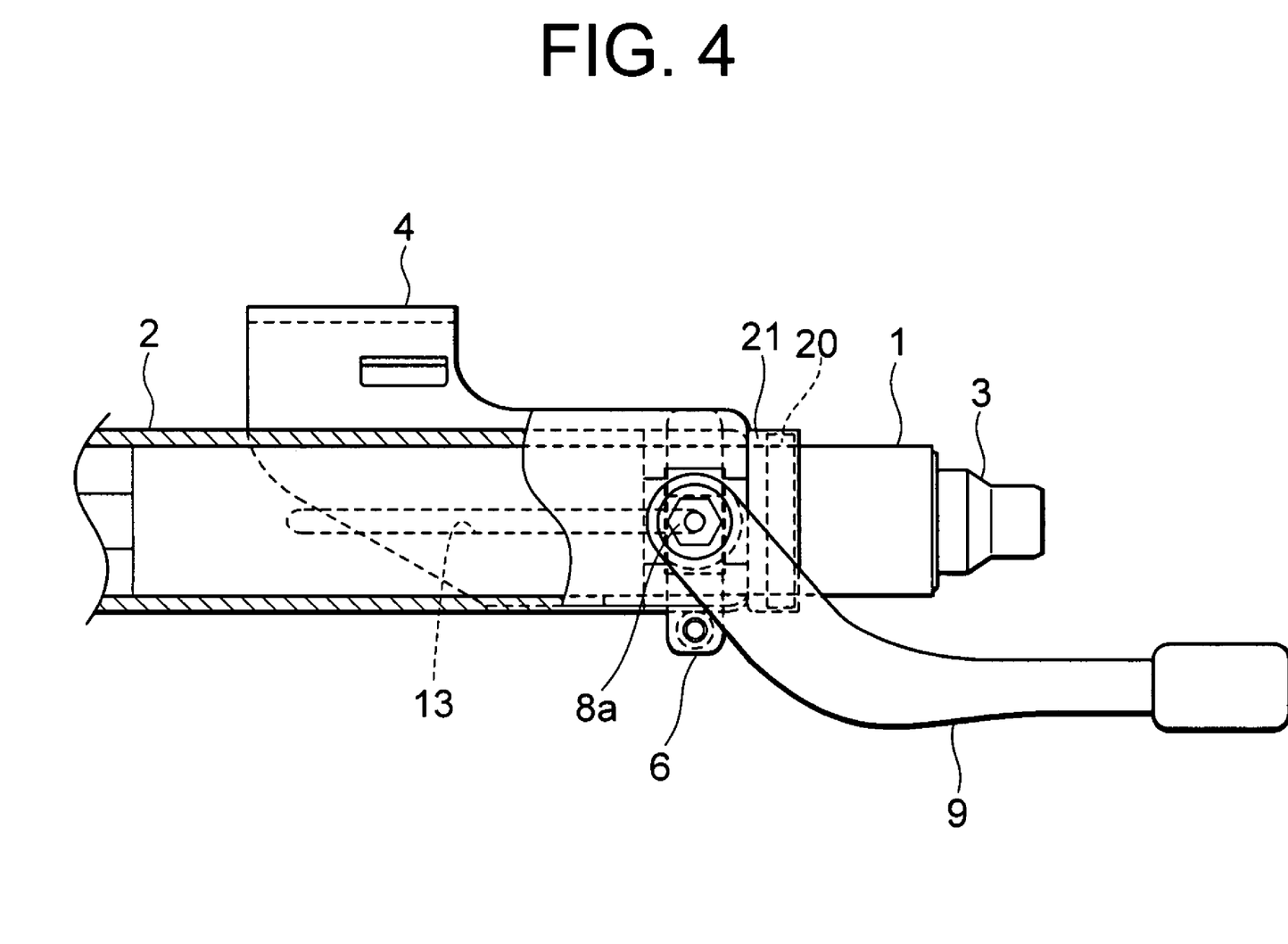
FIG. 4 is a view of the steering column apparatus illustrated in FIG. 1, showing an end state of absorbing an impact when a secondary collision happens.

FIG. 1 is a side view of the impact absorption type tilt/telescopic steering column apparatus according to a first embodiment of the present invention. FIG. 2 is a sectional view taken along the line A-A in FIG. 1. FIG. 3 is a side view of the steering column apparatus illustrated in FIG. 1, showing a shortest telescopic state. FIG. 4 is a view of the steering column apparatus illustrated in FIG. 1, showing an end state of absorbing an impact when a secondary collision happens.

As shown in FIGS. 1 and 2, the first embodiment exemplifies a center retention type tilt/telescopic fastening lock mechanism. An inner column 1 is so fitted into an outer column 2 as to enable telescopic motions, and a steering shaft 3 is rotatably supported within these two columns 1 and 2.

The outer column 2 is supported on a car body via a car body sided bracket 4 of the tilt/telescopic fastening lock mechanism. As illustrated in FIG. 2, the car body sided bracket 4 includes a pair of side plate portions 4a, 4b formed respectively with tilt grooves 5a, 5b.

A ring-shaped member 6 is provided along an outer periphery of the outer column 2. The ring-shaped member 6 is constructed of substantially a U-shaped member 6a and a bolt 6b for fastening lower end portions of this member 6a on both sides.

A pair of flanges 7a, 7b depicted by broken lines in FIG. 2 are provided at side end portions of the outer column 2 and are pinched between the two side plate portions 4a, 4b of the car body sided bracket 4.

When the pair of flanges 7a, 7b are pinched therebetween, a slit 2a formed at a lower end of the outer column 2 is closed, whereby the outer column 2 shrinks in its diameter. With this contrivance, the outer column 2 presses the inner column 1, thereby making it possible to effect a tilt/telescopic fastening process.

A bolt 8a is provided on an outside of one side plate portion 4a of the car body sided bracket 4, and a front end of this bolt 8a is screwed into the ring-shaped member 6.

The bolt 8a is provided with an operation lever 9 and a cam/lock mechanism. This cam/lock mechanism is constructed of a first cam member 10 rotating together with the operation lever 9 and of a second cam member 11 that is non-rotational and serves to effect locking or unlocking by moving in axial directions while engaging with a crest portion or a root portion of the first cam member 10 as the first cam member 10 rotates. Note that a thrust bearing 12 is provided between a head portion of the bolt 8a and the operation lever 9.

Provided on an outside of the other side plate portion 4b of the car body sided bracket 4 is a bolt 8b of which an intermediate portion screwed into the ring-shaped member 6 and a front end penetrates the outer column 2 and engages with a telescopic groove 13 formed in the inner column 1. Note that this telescopic groove 13 is, as shown in FIG. 2, a bottomed rail-shaped groove extending in the axial direction, and a length of this groove 13 is set corresponding to a collapse stroke as shown in FIG. 1. It is to be noted that the telescopic groove 13 may also be formed as a through-hole.

In the thus-structured tilt/telescopic fastening lock mechanism, when rotating the operation lever 9 in one direction in the tilt/telescopic fastening process, the first cam member 10 and the second cam member 11 get separated away from each other by dint of action of the cam/lock mechanism, wherein the first cam member 10 presses the bolt 8a outward (leftward in FIG. 2), while the second cam member 11 presses one side plate portion 4a of the car body sided bracket 4 inward (rightward in FIG. 2).

The bolt 8a pressed outward (leftward in FIG. 2) pulls the opposite bolt 8b inward (leftward in FIG. 2) via the ring-shaped member 6, whereby the bolt 8b presses the other side plate portion 4b of the car body sided bracket 4 inward (leftward in FIG. 2).

Thus, the pair of side plate portions 4a, 4b of the car body sided bracket 4 are pressed inward, and, as a result, the pair of flanges 7a, 7b depicted by the broken lines in FIG. 2 are pinched therebetween. Then, the slit 2a of the outer column 2 is closed, and the outer column 2 gets shrunk in its diameter. Through this operation, the outer column 2 presses the inner column 1, thus enabling the tilt/telescopic fastening.

Thus, since the two columns 1, 2 are fastened evenly from both sides, the center of the two columns 1, 2 can be invariably retained, thereby making it possible to restrain the steering shaft from being decentered (deviation in center).

When canceling the tilt/telescopic fastening, the operation lever 9 is rotated in the other direction, the first cam member 10 and the second cam member 11 approach each other by the action of the cam/lock mechanism. Then, the first cam member 10 moves the bolt 8a inward (rightward in FIG. 2), and the second cam member 11 cancels the pressing upon the one side plate portion 4a of the car body sided bracket 4, with the result that the one side plate portion 4a opens outward (leftward in FIG. 2).

The bolt 8a moves inward (rightward in FIG. 2), and, as a result of this, an inward (leftward in FIG. 2) pull of the opposite bolt 8b can be canceled via the ring-shaped member 6, whereby the other side plate portion 4b of the car body sided bracket 4 opens outward (rightward in FIG. 2).

Thus, the pair of side plate portions 4a, 4b of the car body sided bracket 4 respectively open outward, with the result that the pair of flanges 7a, 7b depicted by the broken lines in FIG. 2 expand outward, thereby making it possible to release the inner column 1 from being fastened by the outer column 2.

Next, according to the first embodiment, as shown in FIG. 1, a metallic ring 20 made of iron, etc. is press-fitted or fitted by other methods in a predetermined position on an outer peripheral surface of the inner column 1. A damper 21 made of a rubber or synthetic resin is provided on the metallic ring 20 on the side of the outer column 2.

As shown in FIG. 3, the metallic ring 20 and the damper 21 function as a stopper for regulating, when adjusting the telescopic motion in a shortest state, the telescopic slide in a way that butts against the outer column 2. Further, on this occasion, the damper 21 prevents butting noises emitted upon butting against the outer column 2 and also restrains an impact thereof.

Moreover, assuming that a secondary collision happens when in the state shown in FIG. 1, a load equal to or larger than a retaining force is applied to the tilt/telescopic fastening lock mechanism, and the inner column 1 moves forwardly of the vehicle along the outer column 2 fixed to the car body, while the front side end of bolt 8b engages with the telescopic groove 13.

When the inner column 1 moves to some extent forwardly of the vehicle, as shown in FIG. 3, the metallic ring 20 and the damper 21 butt against a rear side end portion of the outer column 2. Thereafter, as shown in FIG. 3 through FIG. 4, the inner column 1 further moves forwardly of the vehicle. On this occasion, the metallic ring 20 frictionally slides on the outer peripheral surface of the inner column 1 moving forwardly of the vehicle while engaging with the rear side end portion of the outer column 2, thereby generating a collapse load and absorbing impact energy. As shown in FIG. 4, when the inner column 1 moves down to a tail of the telescopic groove 13, the collapse stroke is terminated.

From what has been discussed above, according to the first embodiment, the setting and the adjustment of the collapse load can be highly facilitated by adjusting the fitting state (fastening state) of the metallic ring 20.

Second Embodiment

Figure 5:
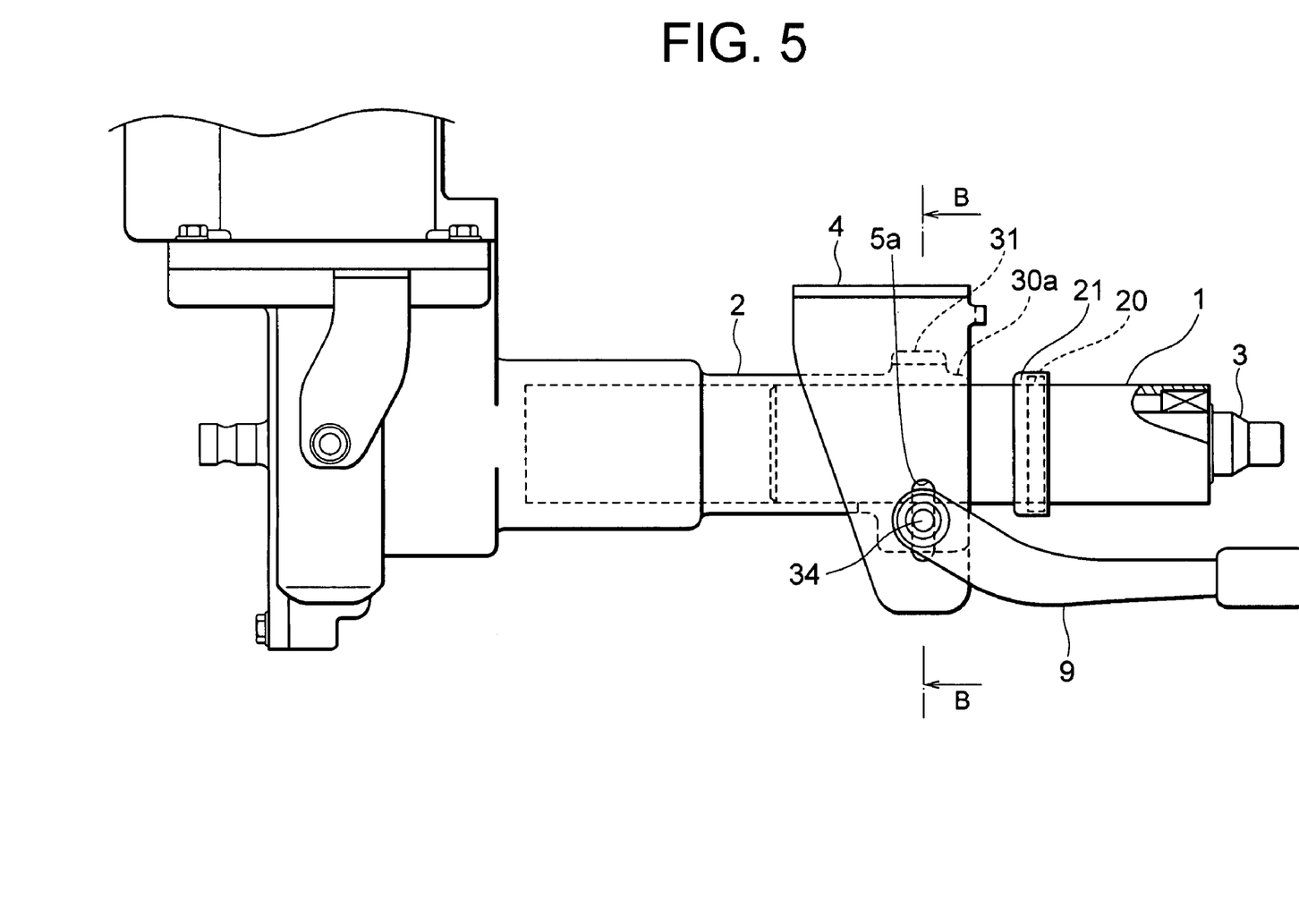
FIG. 5 is a side view of the impact absorption type tilt/telescopic steering column apparatus according to a second embodiment of the present invention.

FIG. 5 is a side view of the impact absorption type tilt/telescopic steering column apparatus according to a second embodiment of the present invention.

Figure 6:
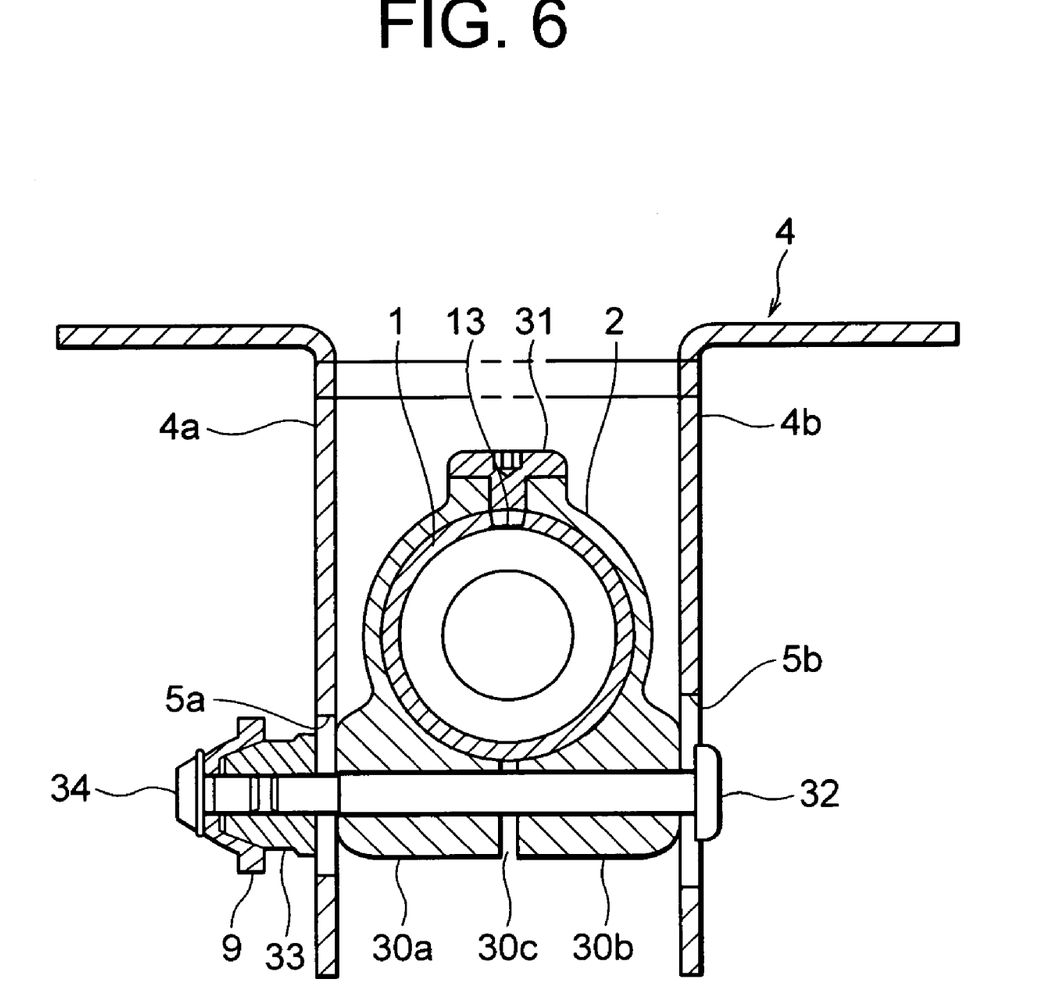
FIG. 6 is a sectional view taken along the line B-B in FIG. 5.

FIG. 6 is a sectional view taken along the line B-B in FIG. 5.

The second embodiment exemplifies a decentering retention type tilt telescopic fastening lock mechanism. A pair of wall-thick embracing pieces 30a, 30b for embracing and thus fastening the inner column 1 are formed integrally at a rear side end of the outer column 2 between the pair of side plate portions 4a, 4b of the car body sided bracket 4. A slit 30c is provided between lower side end portions of the pair of embracing pieces 30a, 30b.

A stopper bolt 31 is secured to an upper portion of the pair of embracing pieces 30a, 30b, and the lower end of the stopper bolt 31 is engaged with the telescopic groove 13.

A fastening bolt 32 is inserted through lower portions of the pair of embracing pieces 30a, 30b between the pair of side plate portions 4a, 4b of the car body sided bracket 4. An adjustment nut 33 is screwed to a thread portion of the front end of the fastening bolt 32, and the operation lever 9 is fitted to the adjustment nut by a fitting bolt 34.

When in the tilt/telescopic fastening process, upon rotating the operation lever 9, the fastening bolt 32 moves leftward in FIG. 6 and presses inward the pair of side plate portions 4a, 4b of the car body sided bracket 4. As a result, the pair of embracing pieces 30a, 30b are so pinched as to close the slit 30c therebetween, thereby making it possible to fasten the inner column 1 by pressing.

When in tilt/telescopic cancellation, upon rotating the operation lever 9 in a reversed direction, the fastening bolt 32 moves rightward in FIG. 6, thereby separating respectively the pair of side plate portions 4a, 4b and the pair of embracing pieces 30a, 30b from each other. A radiation pressure upon the inner column 1 can be thereby canceled.

Next, according to the second embodiment, as shown in FIG. 5, the metallic ring 20 made of the iron, etc. is press-fitted or fitted by other methods in the predetermined position on the inner column 1. A damper 21 made of rubber or synthetic resin is provided on the metallic ring 20 on the side of the outer column 2.

The metallic ring 20 and the damper 21 function as the stopper which butts against the outer column 2 to regulate the telescopic slide, when the telescopic length is adjusted to the shortest state. Further, on this occasion, the damper 21 prevents the butting noises emitted upon butting against the outer column 2 and also restrains then impact thereof.

Moreover, if the secondary collision happens, and when the inner column 1 moves to some extent forwardly of the vehicle, the metallic ring 20 and the damper 21 butt against the rear side end portion of the outer column 2. Thereafter, the inner column 1 further moves forwardly of the vehicle. On this occasion, the metallic ring 20 frictionally slides on the outer peripheral surface of the inner column 1 moving forwardly of the vehicle while engaging with the rear end portion of the outer column 2, thereby generating the collapse load and absorbing the impact energy.

From what has been discussed above, according to the second embodiment, the setting and the adjustment of the collapse load can be highly facilitated by adjusting the fitting state (fastening state) of the metallic ring 20.

Third Embodiment

Figure 7A:
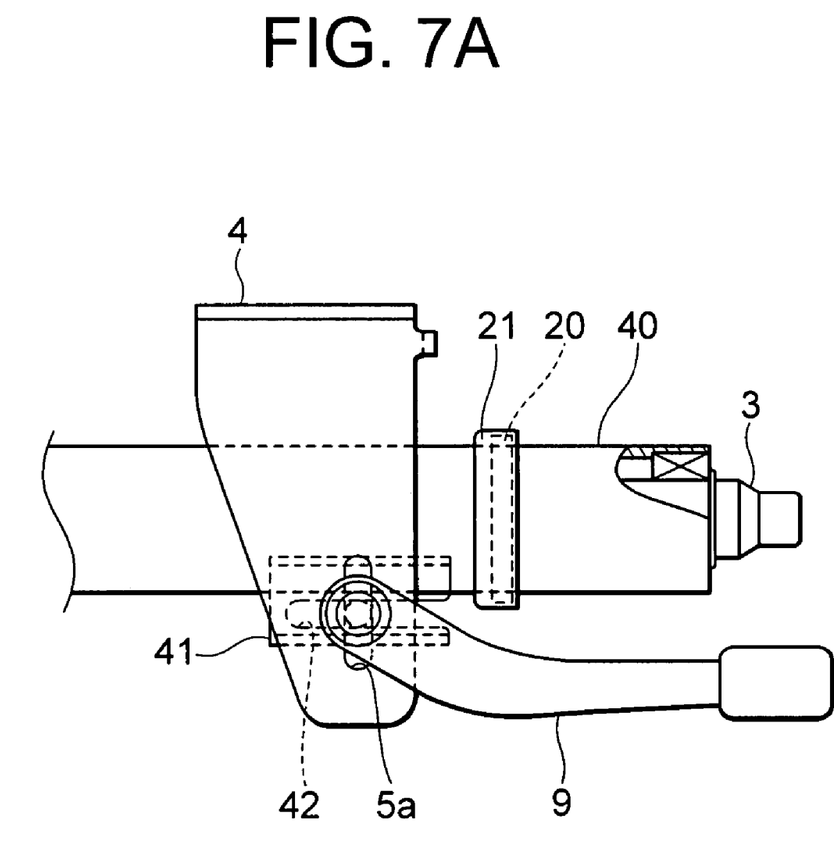
FIG. 7A is a side view of the impact absorption type tilt/telescopic steering column apparatus according to a third embodiment of the present invention.
Figure 7B:
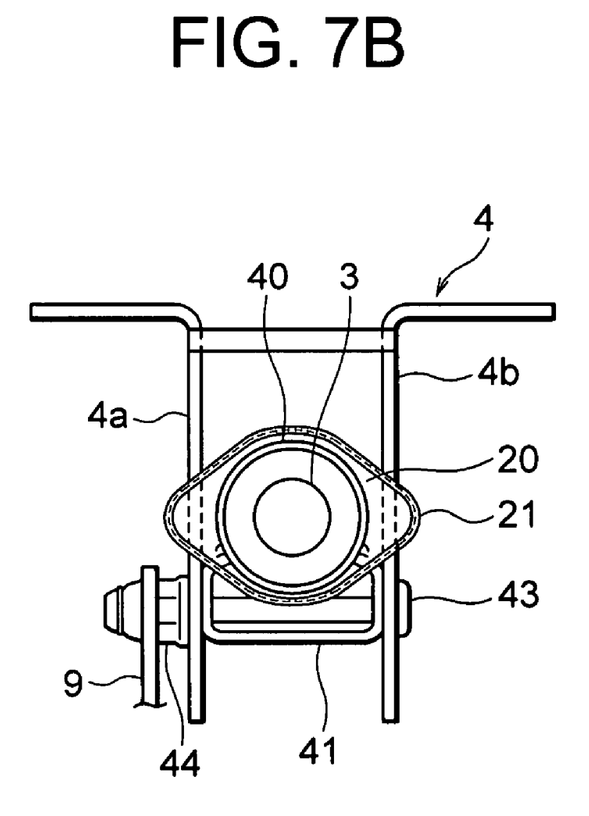
FIG. 7B is a rear view (as viewed from a rear side of the vehicle toward a front side thereof) of the steering column apparatus shown in FIG. 7A.

FIG. 7A is a side view of the impact absorption type tilt/telescopic steering column apparatus according to a third embodiment of the present invention. FIG. 7B is a rear view (as viewed from the rear side of the vehicle toward the front side thereof) of the steering column apparatus shown in FIG. 7A.

In the third embodiment, a steering column 40 is fitted with a distance bracket 41 formed with a telescopic groove 42.

The distance bracket 41 is pinched between the pair of side plate portions 4a, 4b of the car body sided bracket 4. A fastening bolt 43 is inserted through the telescopic groove 42. The fastening bolt 43 is fitted with an adjustment nut 44 and the operation lever 9.

Next, according to the third embodiment, as shown in FIG. 7A, the metallic ring 20 made of iron, etc. is press-fitted or fitted by other methods in the predetermined position on the steering column 40. The damper 21 made of the rubber or synthetic resin is provided on the metallic ring 20 on the side of the outer column 2.

Particularly, in the third embodiment, as shown in FIG. 7B, the metallic ring 20 and the damper 21 are formed in such a configuration as to spread on both sides and so constructed as to be capable of butting (colliding) against the rear end portions of the pair of side plate portions 4a, 4b of the car body sided bracket 4.

With this construction, the metallic ring 20 and the damper 21 function as the stopper which butts against the rear end portions of the pair of side plate portions 4a, 4b of the car body sided bracket 4 to regulate the telescopic slide, when adjusting the telescopic length to the shortest state. Further, on this occasion, the damper 21 prevents the butting noises emitted upon butting against the outer column 2 and also restrains then impact thereof.

Moreover, if the secondary collision happens, and when the steering column 40 moves to some extent forwardly of the vehicle, the metallic ring 20 and the damper 21 butt against the rear end portions of the pair of side plate portions 4a, 4b of the car body sided bracket 4. Thereafter, the steering column 40 further moves forwardly of the vehicle. On this occasion, the metallic ring 20 frictionally slides on the outer peripheral surface of the steering column 40 moving forwardly of the vehicle while engaging with the rear end portions of the pair of side plate portions 4a, 4b, thereby generating the collapse load and absorbing the impact energy.

From what has been discussed above, according to the third embodiment, the setting and the adjustment of the collapse load can be highly facilitated by adjusting the fitting state (fastening state) of the metallic ring 20.

Fourth Embodiment

Figures 8A, 8B:
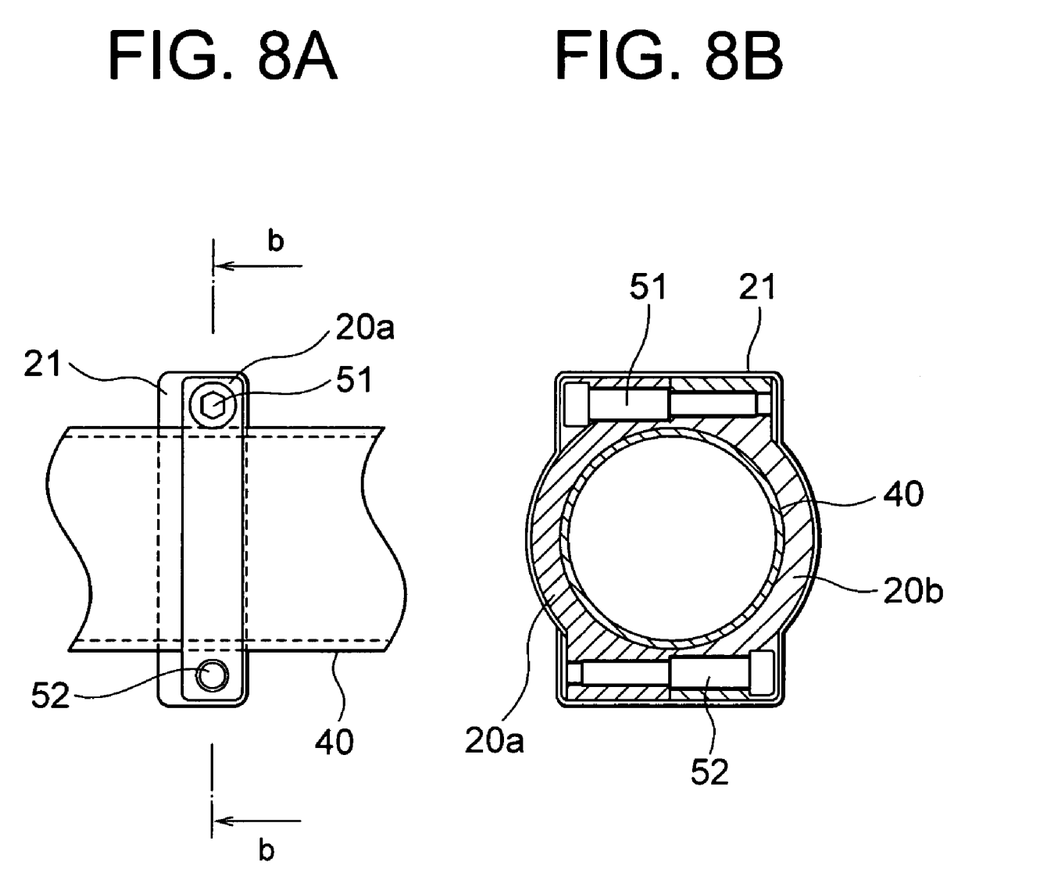
FIG. 8A is a side view of the impact absorption type tilt/telescopic steering column apparatus according to a fourth embodiment of the present invention.
FIG. 8B is a sectional view taken along the line b-b in FIG. 8A.

FIG. 8A is a side view of the impact absorption type tilt/telescopic steering column apparatus according to a fourth embodiment of the present invention. FIG. 8B is a sectional view taken along the line b-b in FIG. 8A.

The metallic ring 20 in the fourth embodiment is constructed of a pair of semi-rings 20a, 20b into which the ring is divided by half. The pair of semi-rings 20a, 20b are fastened at their upper and lower ends by a pair of bolts 51, 52. The damper 21 made of rubber or synthetic resin is covered over these semi-rings 20a, 20b.

Thus, the fitting state (fastening state) of the metallic ring 20 can be adjusted by changing fastening forces of the pair of bolts 51, 52, and the setting and the adjustment of the collapse load can be made much easier than in the embodiments discussed above.

Fifth Embodiment

Figure 9A:
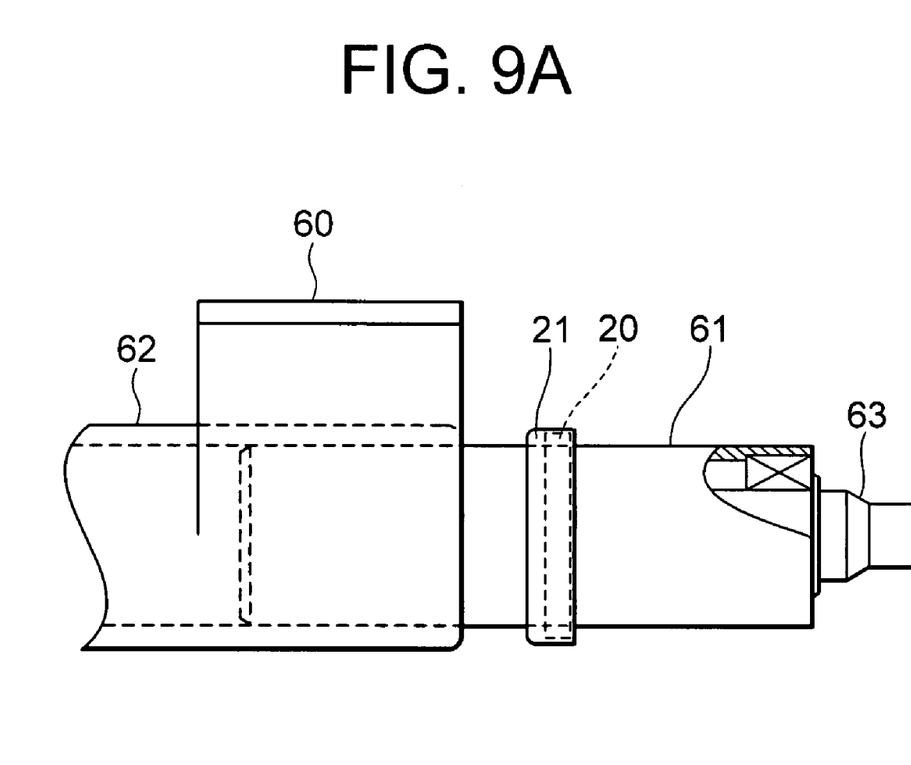
FIG. 9A is a side view of an impact absorption type non-telescopic steering column apparatus according to a fifth embodiment of the present invention.
Figure 9B:
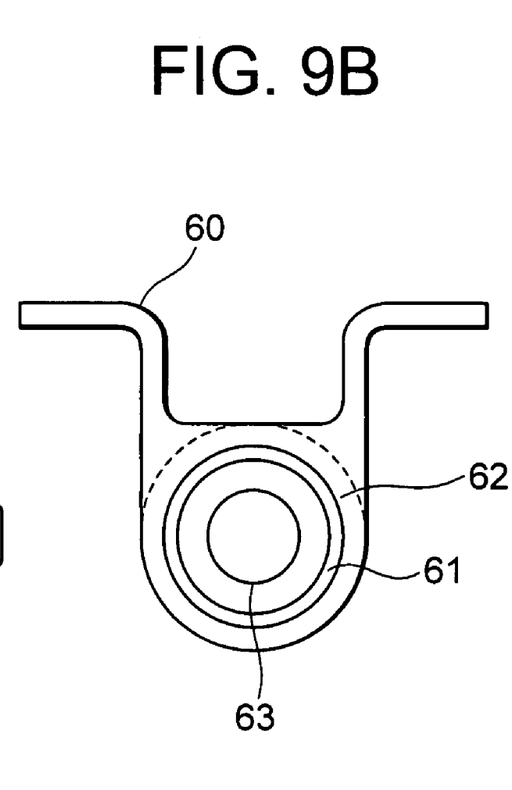
FIG. 9B is a rear view (as viewed from the rear side of the vehicle toward the front side thereof) of the steering column apparatus shown in FIG. 9A.

FIG. 9A is a side view of an impact absorption type non-telescopic steering column apparatus according to a fifth embodiment of the present invention. FIG. 9B is a rear view (as viewed from the rear side of the vehicle toward the front side thereof) of the steering column apparatus shown in FIG. 9A.

The fifth embodiment exemplifies the non-telescopic type incapable of making the telescopic adjustment, wherein an inner column 61 is so fitted as not to slide at a normal time into an outer column 62 formed integrally with a car body sided bracket 60, and a steering shaft 63 is rotatably supported within the two columns 61, 62. When the secondary collision happens, however, the inner column 61 becomes movable forwardly of the vehicle along the outer column 62.

Next, according to the fifth embodiment, the metallic ring 20 made of iron, etc. is press-fitted or fitted by other methods in the predetermined position on the inner column 61. The damper 21 made of rubber or synthetic resin is provided on the metallic ring 20 on the side of the outer column 62.

Upon an occurrence of the secondary collision, when the inner column 61 moves to some extent forwardly of the vehicle, the metallic ring 20 and the damper 21 butt against the rear end portion of the outer column 62. Thereafter, the inner column 61 further moves forwardly of the vehicle. On this occasion, the metallic ring 20 frictionally slides on the outer peripheral surface of the inner column 61 moving forwardly of the vehicle while engaging with the rear side end portion of the outer column 62, thereby generating the collapse load and absorbing the impact energy.

From what has been discussed above, according to the fifth embodiment, the setting and the adjustment of the collapse load can be highly facilitated by adjusting the fitting state (fastening state) of the metallic ring 20.

Sixth Embodiment

Figure 10A:
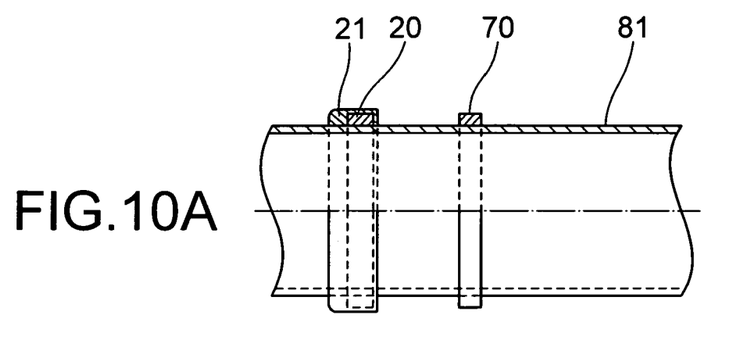
FIG. 10A is a sectional view showing a first example thereof.
Figure 10B:
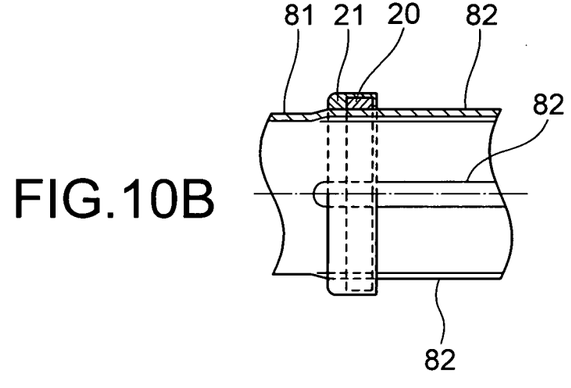
FIGS. 10B and 10C are a sectional view and a rear view showing a second example.
Figure 10C:
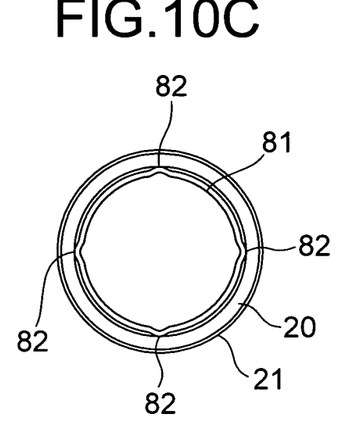
Figure 10D:
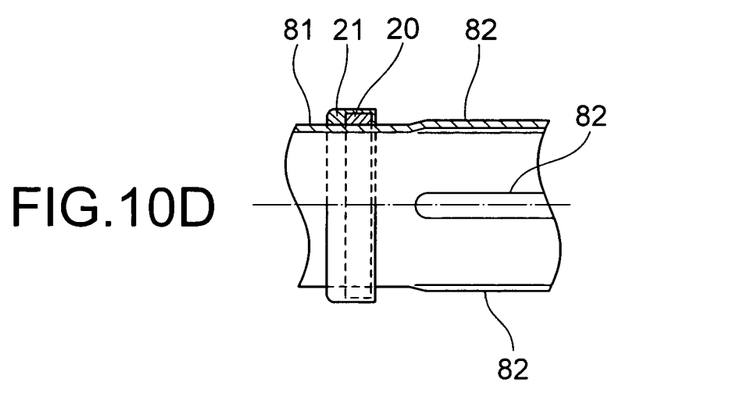
FIG. 10D is a sectional view showing a third example.

FIGS. 10A through 10D are sectional views of the steering column in a sixth embodiment of the present invention. FIG. 10A is a sectional view showing a first example thereof. FIGS. 10B and 10C are a sectional view and a rear view showing a second example. FIG. 10D is a sectional view showing a third example.

Figure 11A:
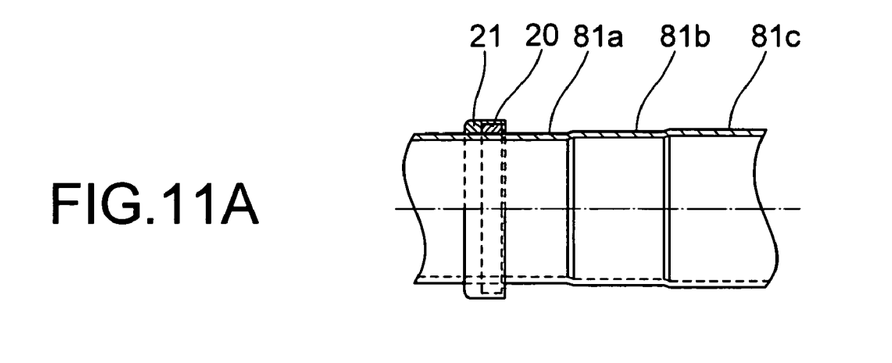
FIG. 11A is a sectional view showing a fourth example thereof.
Figure 11B:
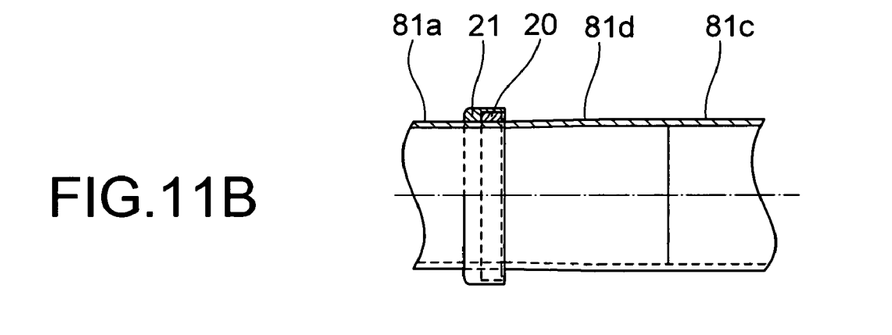
FIG. 11B is a sectional view showing a fifth example.
Figure 11C:
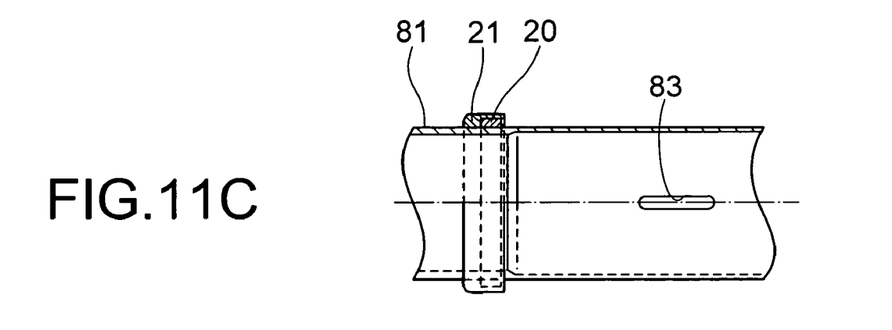
FIG. 11C is a sectional view showing a sixth example.
Figure 11D:
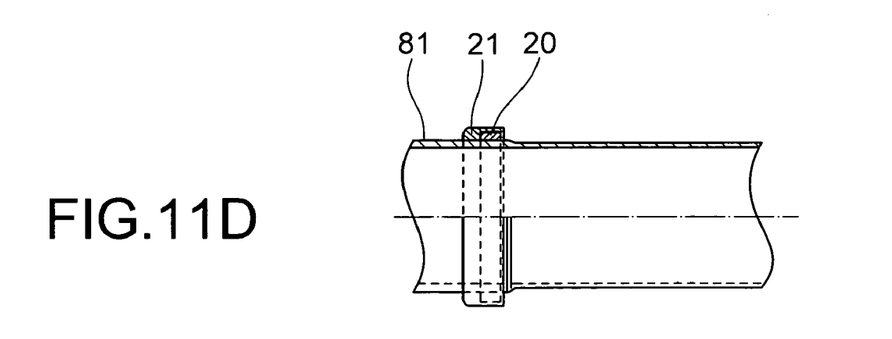
FIG. 11D is a sectional view showing a seventh example.

FIGS. 11A through 11D are sectional views of the steering column in the sixth embodiment of the present invention. FIG. 11A is a sectional view showing a fourth example thereof. FIG. 11B is a sectional view showing a fifth example. FIG. 11C is a sectional view showing a sixth example. FIG. 11D is a sectional view showing a seventh example.

The first example in FIG. 10A is that a different metallic ring 70 is provided in addition to the metallic ring 20 and the damper 21.

The second example in FIGS. 10B and 10C is that a steering column 81 is formed with four lines of protruded streak portions 82 disposed evenly in a peripheral direction. Each protruded streak portion 82 extends in an axial direction. The metallic ring 20 and the damper 21 are fitted to an outer peripheral side of these protruded streak portions 82. Note that the protruded streak portions may be formed by plastic deformation as shown in FIGS. 10B and 10C or by a cut-and-erecting method.

In the third example in FIG. 10D, the metallic ring 20 and the damper 21 are fitted to a part, on the front side of the vehicle, of the protruded streak portion 82. This contrivance increases the collapse load as a resistance caused by the frictional slide rises.

In the fourth example in FIG. 11A, a steering column 81 is constructed of a small-diameter portion 81a, an intermediate-diameter portion 81b and a large-diameter portion 81c. The metallic ring 20 and the damper 21 are fitted to the small-diameter portion 81a. This contrivance schemes to increase the resistance caused by the frictional slide at three stages, thus further augmenting the collapse load.

In the fifth example in FIG. 11B, a tapered portion 81d is formed between the small-diameter portion 81a and the large-diameter portion 81c. The metallic ring 20 and the damper 21 are fitted to the small-diameter portion 81a. This contrivance schemes to gradually increase the resistance caused by the frictional slide, thus further augmenting the collapse load.

In the sixth example in FIG. 11C, the steering column 81 includes the metallic ring 20 formed thin in its wall thickness on the rear side of the vehicle, and is formed with a through-hole 83. This contrivance schemes to reduce the collapse load by decreasing the resistance caused by the frictional slide.

In the seventh example in FIG. 11D, the steering column 81 includes the metallic ring 20 formed thin in its wall thickness of its outside-diameter portion on the rear side of the vehicle. This contrivance schemes to reduce the collapse load by decreasing the resistance caused by the frictional slide.

Note that the present invention is not limited to the embodiments discussed above and can be modified in a variety of forms. The present invention can be applied also to an electric power steering type and is extremely effective in a column type electric power steering because of difficulty of setting a sufficient collapse quantity. Moreover, the present invention can be applied also to a tilt type.

As discussed above, according to a first aspect of the present invention, in the telescopic type steering column apparatus, the metallic ring is fitted to the outer peripheral surface of the steering column (e.g., the inner column). This metallic ring functions as the stopper for regulating the telescopic slide and operates to absorb the impact energy while frictionally sliding on the steering column (e.g., the inner column) moving forwardly of the vehicle in a way that engages with the car body sided member (e.g., the outer column, the car body sided bracket) when the secondary collision happens.

Accordingly, the setting and the adjustment of the collapse load can be highly facilitated by adjusting the fitting state (fastening state) of this metallic ring.

Further, according to the embodiments of the steering apparatus in the first aspect of the present invention, when the damper provided on the metallic ring regulates the telescopic slide, it is possible to prevent the butting noises emitted by butting against the car body sided member (e.g., the outer column, the car body sided bracket) and also to restrain the impact thereof.

Moreover, in the steering column apparatuses according to a second aspect of the present invention, the metallic ring is fitted to the outer peripheral surface of the steering column (for example, the inner column). This metallic ring operates to absorb the impact energy while engaging with the car body sided member (e.g., the outer column, the car body sided bracket) and frictionally sliding on the steering column (e.g., the inner column) moving forwardly of the vehicle, when the secondary collision happens. The second aspect of the present invention can be effectively applied also to the non-telescopic type steering column apparatus.

Accordingly, the setting and the adjustment of the collapse load can be highly facilitated by adjusting the fitting state (fastening state) of this metallic ring.

What is claimed is:

1. An impact absorption type telescopic steering column apparatus for a vehicle, in which a steering column is provided so as to be telescopically adjustable with respect to a vehicle body side member and movable toward a front of the vehicle in response to a secondary collision,
   characterized in that an outer peripheral surface of said steering column is fitted with a ring functioning as a stopper which regulates a telescopic adjustment of said steering column, and which engages with said vehicle body side member to absorb impact energy while frictionally sliding on said steering column moving toward the front of the vehicle when the secondary collision occurs.

2. An impact absorption type steering column apparatus for a vehicle according to claim 1, wherein said ring is provided with a damper so as to prevent butting noises emitted by abutting against said vehicle body side member when regulating the telescopic adjustment.

3. An impact absorption type steering column apparatus for a vehicle according to claim 1, wherein said ring includes a metallic ring member.

4. An impact absorption type steering column apparatus for a vehicle according to claim 1, further comprising a releasable locking mechanism having a fastened state, in which the steering column is fixed at an adjusted position, and a released state, in which a position of the steering column can be adjusted.

5. An impact absorption type steering column apparatus for a vehicle according to claim 1, wherein said ring moves with the steering column during telescopic adjustment so as to be stopped by the vehicle body side member at a limit of the telescopic adjustment.

6. An impact absorption type steering column apparatus for a vehicle according to claim 1, wherein said ring includes a damper member that is brought into contact with the vehicle body side member at a limit of the telescopic adjustment.

7. An impact absorption type steering column apparatus for a vehicle, in which a steering column includes an outer column and an inner column that is telescopically adjustably fitted in said outer column and movable toward a front of the vehicle with respect to a vehicle body side member in response to a secondary collision,
   characterized in that the inner column of said steering column is fitted with a ring that functions as a stopper so as to regulate a telescopic adjustment of said inner column and to absorb impact energy while frictionally sliding on said inner column when the secondary collision occurs.

8. An impact absorption type steering column apparatus for a vehicle according to claim 7, wherein said ring includes a metallic ring member.

9. An impact absorption type steering column apparatus for a vehicle according to claim 7, further comprising a releasable locking mechanism having a fastened state, in which the inner column is fixed at an adjusted position, and a released state, in which a position of the inner column can be adjusted.

10. An impact absorption type steering column apparatus for a vehicle according to claim 7, wherein said ring moves with the inner column during telescopic adjustment so as to be stopped by the outer column at a limit of the telescopic adjustment.

11. An impact absorption type steering column apparatus for a vehicle according to claim 7, wherein said ring includes a damper member that is brought into contact with the outer column at a limit of the telescopic adjustment.

* * * * *